US 8,467,528 B2

Jun. 18, 2013

(12) United States Patent
Sita et al.

(10) Patent No.: US 8,467,528 B2
(45) Date of Patent: Jun. 18, 2013

(54) MULTIMEDIA CONTENT PROTECTION

(75) Inventors: Richard K. Sita, Audubon, NJ (US);
Kunal K. Dave, Sayreville, NJ (US);
Jitesh Arora, Markham (CA); Michael J. Erwin, Columbus, NJ (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 774 days.

(21) Appl. No.: 11/847,786

(22) Filed: Aug. 30, 2007

(65) Prior Publication Data
US 2008/0168266 A1    Jul. 10, 2008

Related U.S. Application Data

(60) Provisional application No. 60/824,146, filed on Aug. 31, 2006.

(51) Int. Cl.
*H04N 7/167* (2006.01)

(52) U.S. Cl.
USPC ............ 380/201; 725/132; 725/140; 725/152

(58) Field of Classification Search
USPC ........................... 380/201; 725/132, 140, 152
See application file for complete search history.

(56) References Cited

U.S. PATENT DOCUMENTS

| | | | |
|---|---|---|---|
| 6,198,875 B1* | 3/2001 | Edenson et al. | 386/259 |
| 6,526,220 B2* | 2/2003 | Oguro et al. | 386/94 |
| 7,180,776 B1* | 2/2007 | Wennekamp et al. | 365/185.04 |
| 2003/0154377 A1* | 8/2003 | Hirai et al. | 713/176 |
| 2004/0114907 A1* | 6/2004 | Rinaldi | 386/94 |
| 2004/0243823 A1* | 12/2004 | Moyer et al. | 713/200 |
| 2005/0154921 A1* | 7/2005 | Medvinsky | 713/201 |
| 2007/0156638 A1* | 7/2007 | Vadekar et al. | 707/1 |
| 2009/0210346 A1* | 8/2009 | Candelore | 705/57 |
| 2009/0323946 A1* | 12/2009 | Wasilewski | 380/200 |

OTHER PUBLICATIONS

Tai, H. (2004). TUSB6250 Bootcode Application Note.*

* cited by examiner

*Primary Examiner* — Matthew T Henning
*Assistant Examiner* — Brian Shaw
(74) *Attorney, Agent, or Firm* — Volpe and Koenig, P.C.

(57) ABSTRACT

A system on a chip including a bus, a bootup module coupled to the bus and configured to cause the system on a chip to bootup in accordance with a selected security mode, an input module coupled to the bus and configured to receive an input signal and to provide the input signal to the bus, a processor coupled to the bus and configured to process the input signal to provide an intermediate signal, in accordance with a type of content protection associated with the input signal, an encryption module coupled to the bus and configured to cause at least a portion of the intermediate signal to be encrypted to produce an encrypted signal, in accordance with the type of the content protection, and an output module coupled to the bus and configured to output the encrypted signal.

14 Claims, 3 Drawing Sheets

MULTIMEDIA CONTENT PROTECTION

RELATED APPLICATIONS

This application claims the benefit of U.S. Provisional Application No. 60/824,146, filed Aug. 31, 2006, which is incorporated by reference herein in its entirety.

BACKGROUND

Today, as personal computers (PCs) continue to achieve higher levels of performance at an affordable price, increased numbers of people are turning to a PC as a means to view multimedia content. For example, multimedia content can include analog and/or digital signals that provide video and/or audio information. Thus, examples of multimedia content include cable television feeds provided by cable service providers, video information provided by DVD players, video information provided by digital video recorders, and/or video information stored in PCs.

Multimedia content is typically protected using one or more forms of content protection in order to control access to the content (e.g., to prevent unauthorized viewing and/or copying). Content protection can take various forms (e.g., digital rights management, copy protection, etc.) and include varying levels of protection. For example, some content protection includes the ability to limit the number of copies of a multimedia file that can successfully be made, prevent all copying of the multimedia file, and/or prevent sharing of the multimedia file. Other types of content protection place limitations on where the multimedia file can be played, e.g., only on one specific computer, or several computers having a common owner. Typically, the level of content protection is chosen as a function of the intended specific application. For example, distribution of a pre-release first-run movie typically uses a very high level of protection, because a single breach of the content protection scheme could have devastating effects. Conversely, streaming video including syndicated re-runs of a popular television show typically uses a lower level of protection because the goal of the content protection is to prevent widespread copying, rather than a single instance of copying.

SUMMARY

In general, in an aspect, implementations of the invention may provide a system on a chip including a bus, a bootup module coupled to the bus and configured to cause the system on a chip to bootup in accordance with a selected security mode, an input module coupled to the bus and configured to receive an input signal and to provide the input signal to the bus, a processor coupled to the bus and configured to process the input signal to provide an intermediate signal, in accordance with a type of content protection associated with the input signal, an encryption module coupled to the bus and configured to cause at least a portion of the intermediate signal to be encrypted to produce an encrypted signal, in accordance with the type of the content protection, and an output module coupled to the bus and configured to output the encrypted signal.

Implementations of the invention may provide one or more of the following features. The input module is configured to determine the type of content protection associated with the input signal. The bootup module is configured to obtain application firmware from a host and to authenticate the firmware in accordance with the selected security mode. The bootup module is coupled to a boot memory, the boot memory being configured to store boot instructions. The input module includes a tuner. The processor is configured to preserve the content protection associated with the input signal.

In general, in another aspect, implementations of the invention provide a method including booting a processor in accordance with a selected security mode, receiving an incoming signal that includes content protection, recognizing the presence of content protection in the incoming signal, processing the incoming signal in accordance with the content protection and the selected security mode to produce an intermediate signal, encrypting at least a portion of the intermediate signal, in accordance with the content protection, to produce an encrypted signal, and providing the encrypted signal to the host.

Implementations of the invention may provide one or more of the following features. The method further includes determining a type of the content protection. Booting the processor includes obtaining application firmware from a host. Booting the processor includes authenticating application firmware in accordance with the selected security mode. Booting the processor includes obtaining boot instructions from a boot memory coupled to the processor. The method further includes demodulating the incoming signal using a tuner. The method further includes preserving the content protection associated with the input signal in the encrypted signal.

In general, in another aspect, implementations of the invention may provide a multimedia capture device for use with an incoming signal including content protection, the device including a host, and a processor coupled to the host and configured to operate in a plurality of security modes, execute a bootup sequence in accordance with a selected security mode of the plurality of security modes, retrieve operational instructions from the host in accordance with the selected security mode, receive the incoming signal and to identify the presence of the content protection; process the incoming signal to produce an intermediate signal in accordance with the operational instructions and a type of the content protection, encrypt a portion of the intermediate signal, in accordance with the operational instructions and the type of the content protection, to produce an encrypted signal, and provide the encrypted signal to the host.

Implementations of the invention may also provide one or more of the following features. The processor is further configured to determine a type of the content protection. The processor is further configured to obtain the bootup sequence from a boot memory. The processor is further configured to obtain application firmware from the host. The processor is further configured to authenticate the application firmware in accordance with the security mode. The processor is further configured to demodulate the incoming signal. The processor is further configured to preserve the content protection associated with the incoming signal.

Various aspects of the invention may provide one or more of the following capabilities. Multiple security modes can be provided using a single hardware design of a multimedia system on a chip. Security levels of a multimedia system on a chip can be chosen as a function of the intended application. The difficulty of circumventing content protection can be increased compared to prior methods. Multiple types of content protection can be processed by a single multimedia system on a chip. Content-protected MPEG video streams can be compressed while preserving content protection associated with the MPEG video stream. Analog signals can be captured, digitized, compressed, and outputted while preserving content protection associated with the analog signals. Digital signals can be compressed and outputted while preserving content protection associated with the digital signals. Content-protected signals can be transmitted via a "user-accessible bus" using encryption. New content protection schemes can be recognized by a multimedia system on a chip (e.g., using downloaded software). A multimedia system on a chip can be booted-up using a method that corresponds to a selected security mode. Access to internal registers and/or memory can be inhibited in accordance with a selected security mode. A multimedia system on a chip can detect the presence of a blank EEPROM and can bypass system security measures to initially program the blank EEPROM. Complexity of the manufacturing process (e.g., programming of an EEPROM) can be reduced compared with prior techniques by disabling all security if the EEPROM is empty.

These and other capabilities of the invention, along with the invention itself, will be more fully understood after a review of the following figures, detailed description, and claims.

DETAILED DESCRIPTION

Embodiments of the invention provide techniques for providing a video capture device including multiple selectable security modes. For example, a capture device includes a processor and is coupled to a host. The processor executes a bootup sequence in accordance with a selected security mode, and obtains application firmware in accordance with the selected security mode. The processor receives incoming video signals that may include content protection. The processor recognizes the presence of content protection in the incoming video signals. The processor processes the video signals in accordance with the selected security mode, the application firmware, and with the content protection associated with the video signals. The processor encrypts the processed video signal in accordance with the content protection and the application firmware and provides the encrypted video signal to the host. The host decrypts the encrypted video signal and processes the decrypted video signal in accordance with the content protection. Other embodiments are within the scope of the invention.

Figure 1:
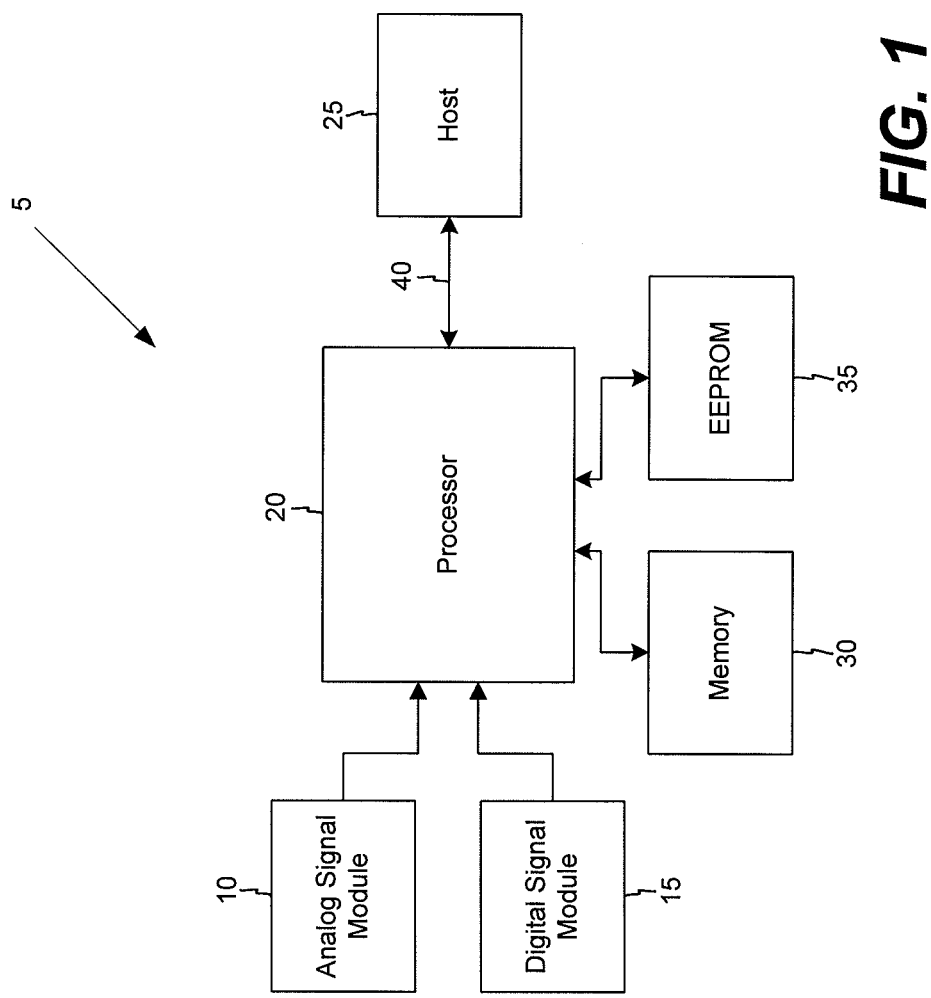
FIG. 1 is a block diagram of a video capture device, including a processor, used to process video signals.

Referring to FIG. 1, a video processing system 5 includes an analog signal module 10, a digital signal module 15, a processor 20, a host 25, a memory 30, and an EEPROM 35, although other configurations are possible. The analog signal module 10 is coupled to the processor 20 and can be configured to receive an analog video signal from a source such as a cable service provider and/or a VCR. The analog signal module 10 can include analog signal processing circuitry such as a tuner module configured to select and/or isolate one or more channels of a multi-channel analog signal. The digital signal module 15 is coupled to the processor 20 and can be configured to receive a digital video signal from a source such as a cable service provider, a DVD player, and/or a digital video recorder. The digital signal module 10 can include digital signal processing circuitry such as a digital tuner module configured to select and/or isolate one or more channels of a multi-channel digital signal. The analog signal module 10 and/or the digital signal module 15 can be omitted from the system 5. For example, a single cable television feed including an analog and a digital video signal could be coupled directly to the processor 20. The memory 30 is, for example, RAM.

The processor 20 can be configured to receive one or more content-protected video signals via the analog signal module 10 and/or the digital signal module 15 and to provide a content-protected video signal to the host 25. For example, the processor 20 can be configured to receive an analog content-protected signal, digitize the analog content-protected video signal, compress the newly generated digital content-protected video signal, encrypt the newly generated digital content-protected video signal, and provide the newly generated digital content-protected video signal to the host 25. The processor 20 is also configured to receive a digital video signal, process the digital video signal (e.g., compress, resample, color convert, etc.), and to provide the content-protected processed digital video signal to the host 25.

The system 5 is preferably a tamper-resistant processor that can be configured to inhibit a user from circumventing the content protection and/or misappropriating the content-protected video signal. For example, the processor 20 can be encased in a blob of epoxy on a circuit board thereby increasing the difficulty of physically accessing the processor 20. The processor 20 can be configured such that certain components that typically reside elsewhere in the system 5 (e.g., the memory 30) can reside within the processor 20 (e.g., increasing the difficulty of physically accessing the memory 30). Input pins used to select a security level of the processor 20 can be internally strapped within the processor 20 (e.g., the input pins are internally hardwired to a signal source and there is no externally accessible pin or ball). At-risk pins/balls can be disposed at difficult to reach locations (e.g., in the center of a ball grid array). The processor 20 can be disposed on a circuit board in such a way to make access difficult (e.g., within several layers of a printed circuit board). The EEPROM 35 can be located on the underside of the processor 20 (e.g., between the processor 20 and a circuit board on which the processor 20 is disposed. At risk traces of a circuit board on which the processor 20 and/or EEPROM 35 are disposed can be located on internal layers of the printed circuit board. At risk traces of a circuit board on which the processor 20 and/or EEPROM 35 are disposed can be obscured by other components of the system 5. External access to the memory 30 and/or registers contained within the processor 20 can be restricted.

The processor 20 can be configured to provide multiple selectable levels of security, which can differ based on the security requirements of the intended use of the processor 20. For example, the processor 20 can be configured to toggle between multiple security modes mode according to a selection signal provided to the processor 20. The selection signal can be provided from within the processor 20 (e.g., the input is internally hard-wired into the processor 20), or via an externally accessible pin. Referring to Table 1 (below), exemplary security levels are shown. For example, the processor 20 can be configured such that methods of access to the processor 20 can be varied according to the selected level of security. In accordance with the desired level of security, access to internal registers can be restricted, access to the memory 30 can be restricted, the processor 20 can be booted using varying methods, application firmware can be provided using different methods, and/or test pin access can be restricted. Thus, the choice of security mode for a given product application can be varied according to an anticipated skill level of an attacker and/or the relative value of the content being protected.

TABLE 1

| Security Level | Enable Method | EEPROM | Bootup Firmware | Application Firmware | Register Access | Memory Access | ASIC test pins accessible |
|---|---|---|---|---|---|---|---|
| Off |  | Optional | From Host | Download from Host | All* | All* | Always* |
| Low | Set write-once register | Optional | From Host | Download from Host | Restricted to global subset | Restricted to global aperture | Prior to entering secure mode |
| Medium | Solder a package pin to voltage plane | May be external | From EEPROM | Download from Host - authenticated by Bootup firmware | Restricted to global subset | Restricted to global aperture | Prior to entering secure mode |
| High | Set secure mode inside of ASIC | Inside of ASIC | From EEPROM | Download from Host - authenticated by Bootup Firmware | Restricted to global subset | Restricted to global aperture | Prior to entering secure mode |

*Preferably

The processor 20 can be configured to operate at a lower level of security than that indicated by the physical design of the processor 20. For example, a processor configured to run at the high level of security includes an internal EEPROM. Notwithstanding this internal EEPROM, the high level security processor can operate in the no security, low security, and/or medium security mode (which do not typically use an internal EEPROM).

The EEPROM 35 is non-volatile storage configured to provide bootup information to the processor 20. The EEPROM 35 preferably has a Sector-Write-Protect feature. For example, the EEPROM 35 can be configured to define regions that are not overwritable, while defining other regions that are overwritable. The EEPROM 35 can be configured to inhibit (and possible prevent) overwriting after initial programming (e.g., the EEPROM 35 can be a write-once EEPROM), or can be configured to be reprogrammed without physical removal from the system 5. The EEPROM 35 can be configured to contain firmware for use by the processor 20. The EEPROM 35 can be configured to contain a public key for use during an authentication process, and a unique serial number. While the EEPROM 35 is shown in FIG. 1 as being located externally from the processor 20, the EEPROM 35 can be omitted and/or located within the processor 20 (e.g., according to the selected security level).

The processor 20 can be configured to receive, recognize, and process content-protected video signals using a variety of content protection schemes. The processor 20 can be configured to recognize the type of incoming signal (e.g., cable, DVD), and a corresponding type of content protection (e.g., broadcast flag, Macrovision®, Copy Generation Management System—Analog, Copy Control Information Signaling). The processor 20 can be configured to process the incoming video signal in accordance with the content-protection used by the incoming video signal. The processor 20 can be configured to be reprogrammed to recognize and/or process additional content protection schemes. For example, the processor 20 can be updated via the Internet. Furthermore, the processor 20 can be programmed with content protection schemes used throughout the world, while being configured to process only a sub-set of the included content protection schemes. For example, a version of the processor 20 operating in the U.S. can be configured not to process content-protected video signals protected using Japanese content protection.

The processor 20 is coupled to the host 25 via a connection 40 and can be configured to provide the content-protected video signal to the host 25. The connection 40 is a PCI bus, although other configurations are possible. For example, the host 25 can be coupled to the processor 20 using PCIE, Ethernet, wireless Ethernet (e.g., 802.11g), IEEE-1394, USB, a serial connection, a satellite connection, etc. Under certain circumstances, the connection 40 can be considered a user-accessible bus, with information transmitted via the connection 40 being protected using encryption. For example, in the context of a PCI bus in a PC, it can be relatively easy for a user to monitor/hijack information traveling over the PCI bus by plugging in a monitoring device into an open PCI slot in the PC. Thus, the processor 20 can be configured to encrypt information provided to the host 25 via the connection 40 (e.g., providing an encrypted video signal to the host 25). The host 25 can be configured to receive the encrypted video signal, to decrypt the encrypted video signal, and to provide (e.g., display) the video information contained within the video signal to a user.

The processor 20 can restrict access to the memory 30, by the host 25, depending on the selected security level. As noted above in Table 1, when the system 5 is operating in the no-security mode, the memory 30 can preferably be accessed by any portion of the system 5. When the system 5 is operating in the low, medium, and/or high security modes, preferably only a portion of the memory 30, as defined by an aperture, is accessible to the host 25. The aperture can be defined during bootup of the processor 20, or at other times. Likewise, the processor 20 can be configured to restrict access to registers contained within the processor 20 as a function of the selected security level.

Figure 2:
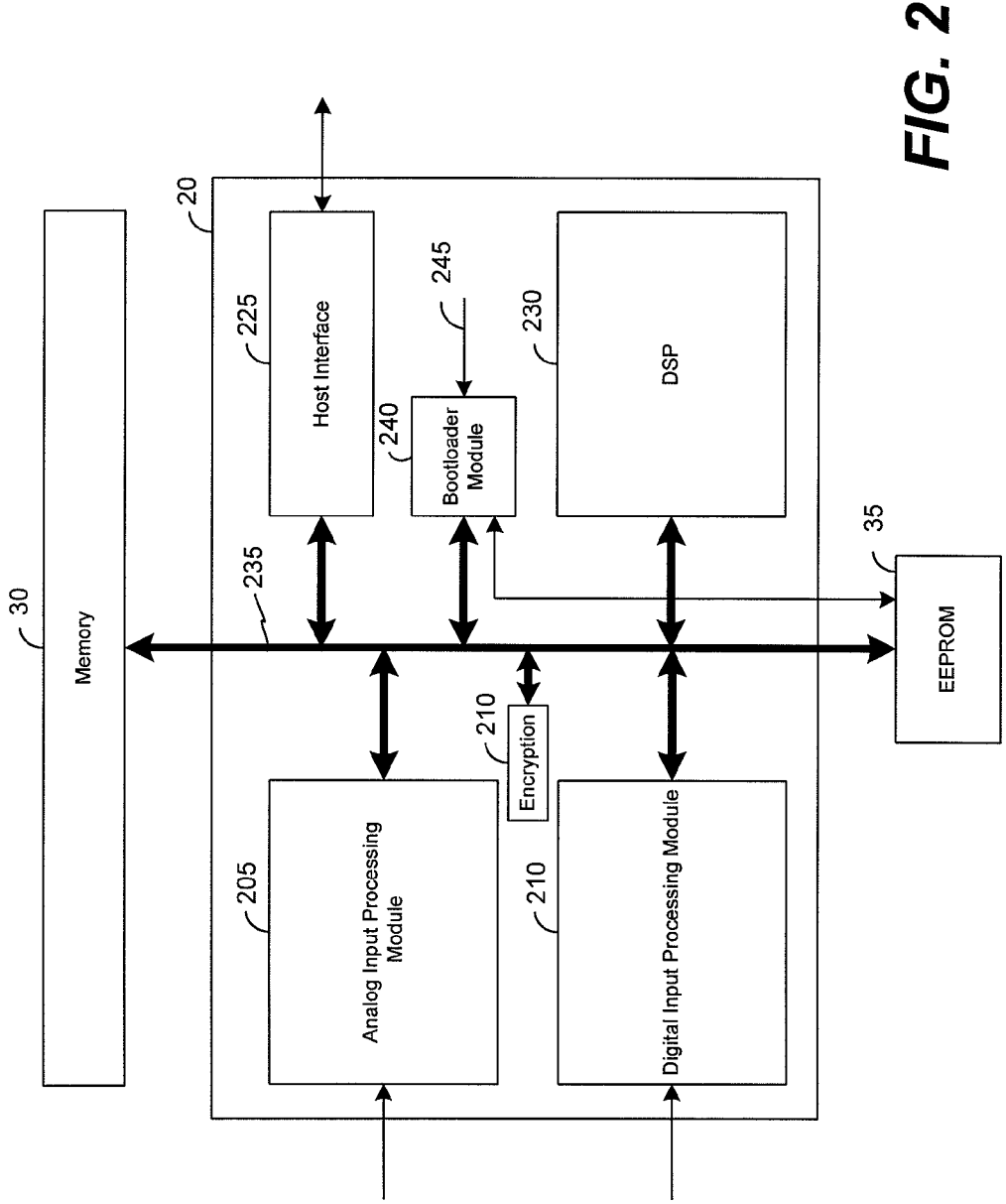
FIG. 2 is a block diagram of the processor shown in FIG. 1.

Referring also to FIG. 2, the processor 20 includes an analog input processing module 205, a digital input processing module 210, an encryption module 215, a host interface 225, a digital signal processor (DSP) 230, a bus 235, and a bootloader module 240. The processor 20 can be configured to receive an incoming analog and/or digital video signal, to process the incoming video signal while preserving content protection present in the incoming video signal, and to output an output video signal.

The analog input processing module 205 can be configured to receive an analog video signal from the analog signal module 10 and to process to the analog video signal, although other configurations are possible (e.g., the analog signal module 10 can be omitted). For example, the analog input processing module 205 can be configured to convert the analog video signal into a digital video signal that is provided to other portions of the processor 20 via the bus 235. The analog input processing module 205 is also configured to demodulate the analog video signal (e.g., demodulating a QAM signal). The analog input processing module 205 can be configured to recognize the presence of content protection in an incoming analog video signal. For example, the analog input processing module 205 can be configured to recognize the presence of a Macrovision® signal, a copy generation management system signal, and/or a redistribution control signal in the incoming analog video signal. The analog input processing module 205 can be configured to set a flag in the memory 30 indicating the presence of the content protection, and can be configured to set additional flags identifying the type of content protection.

The digital input processing module 210 can be configured to receive a digital video signal from the digital signal module 15 and to process the digital video signal, although other configurations are possible (e.g., the digital signal module 15 can be omitted). The digital processing module 205 can be configured to receive an MPEG2 transport stream that includes multiple transport stream packets. The digital processing module 205 can be configured to recognize the presence of a content protection scheme indication in the incoming transport stream packets (e.g., in a header of the transport stream packets). The digital input processing module 210 can be configured to set a flag in the memory 30 indicating the presence of the content protection, and can be configured to set additional flags identifying the type of content protection.

The DSP module 230 can be configured to receive a video signal, e.g., from the analog input processing module 205 and/or the digital input processing module 210, and to output a processed version of the received signal. For example, the DSP module 230 can be configured to compress the received signal to preserve bandwidth, to filter the received signal (e.g., to remove noise), to perform color conversion, and/or to convert the output of the analog input processing module 205 into an MPEG transport stream. The DSP module 230 can be configured to output the MPEG transport stream packets, which preferably each include a header portion and a payload. Furthermore, the DSP module 230 can be configured to read the flags set by the analog input processing module 205 and/or the digital input processing module 210 in order to determine how to process a video signal.

The encryption module 215 can be configured to oversee encryption of the processed video signal. The encryption module 215 can be configured to encrypt the payload portions of the MPEG transport stream packets using encryption (e.g., Advanced Encryption Standard (AES) encryption and/or RSA encryption). The encryption module 215 can be configured to encrypt the MPEG transport stream packets using a key (e.g., a symmetrical key and/or an asymmetrical key) and to facilitate key distribution to the host 25 (e.g., so that the host 25 can decrypt the encrypted MPEG transport stream packets). While the encryption module 215 has been described as using AES encryption using a symmetrical key, other configurations are possible. While the encryption module 215 has been described as encrypting the processed video signal, other configurations are possible. For example, the encryption module 215 can be configured to cause the DSP module 230 to encrypt the processed video signal.

The encryption module 215 can be configured to provide content protection information in the headers (which can be unencrypted) of the MPEG transport stream packets. The encryption module 215 can be configured to provide an indication to the host 25 of which type of content protection the transport stream packets are subject to. For example, types of content protection include "copy once," "copy never," "copy no more," and "copy freely." The system 5 can be configured such that each type of content protection uses a different decryption key. Thus, by providing information indicating the chosen content protection scheme, the processor 20 is also providing an indication of which decryption key to use. For example, to decode a "copy never" packet a first key is used, to decode a "copy freely" packet, a second key is used, etc. If a user attempts to change the content protection scheme of an MPEG transport stream packet (e.g., changing the identification from "copy once" to "copy freely"), the MPEG transport stream packet payload is still protected by encryption (e.g., because by changing the content protection indication, the user is also changing the key indication to a wrong key). Thus, if the wrong key indication is provided to the host 25, the host 25 is inhibited (and possibly prevented) from decrypting the MPEG transport stream packet.

The host interface 225 can be configured to provide an interface between the bus 235 and the connection 40. The bus 235 can be configured as a PCI bus, although other configurations are possible. The host interface 225 can be configured to receive, via the bus 235, the encrypted processed video signal from the DSP 230, or alternatively, can receive the encrypted processed video signal from the memory 30 (e.g., when the memory 30 is acting as a frame buffer). The host interface 225 can be configured to provide the encrypted processed video signal to the host 25 via the connection 40, using the same protocol as the connection 40.

The bootloader module 240 can be configured to facilitate bootup of the processor 20 using a method that corresponds to the selected security level. The bootloader module 240 can be configured to provide secure bootup sequences and/or a non-secure bootup sequence. The bootloader module 240 can be configured to receive a signal 245 indicating the desired bootup sequence to use (e.g., the selection signal). Depending on the selected security level, the signal 245 can be provided to the bootloader module 240 from a source external to the processor 20 (e.g., via an external pin) and/or can be provided to the bootloader module 240 from a source included within the processor 20 (e.g., to reduce the likelihood of the signal 245 being altered). The bootloader module 240 can be configured to receive bootup instructions from either the host 25 and/or the EEPROM 35, depending on the level of selected security. As shown above in Table 1, when the processor 20 is booted in the non-secure mode or the low security mode, the bootup instructions are received from the host 25 via the connection 40. Likewise, the bootloader module 240 can be configured to receive the bootup instructions from the EEPROM 35 in the medium and/or high security mode.

The system 5 can be configured to, depending on the selected security level, store updated bootup instructions in the EEPROM 35. For example, the host 25 can be configured to download updated authenticated bootup instructions from a trusted source (e.g., the manufacturer of the processor 20). The updated bootup instructions can be authenticated using a hash code and a digital signature that is signed by the trusted source. For example, the host 25 can be configured to download the updated authenticated instructions (e.g., from the Internet), which can be encrypted using SHA-1, AES, and/or RSA. The processor 20 can be configured to receive the downloaded updated instructions from the host 25. The processor 20 can be configured to decrypt and/or authenticate the hash code and the digital signature prior to overwriting the bootup instructions stored in the EEPROM 35. The processor 20 can be configured to detect if the EEPROM 35 is empty (e.g., all bits are set to "1"). For example, if the EEPROM 35 is empty, the processor 20 can be configured to accept updated bootup instructions without authentication. After initial programming during manufacture, the system 5 can be configured to disable the ability of the processor 20 to detect if the EEPROM 35 is empty (e.g., guarding against a potential attack where a blank EEPROM is emulated).

The processor 20 can be configured to operate using application firmware that is, for example, provided by the host 25. The processor 20 can be configured to download the application firmware from the host 25 and to authenticate the firmware provided by the host 25 depending on the selected level of security. For example, the host 25 can be configured to encode, when operating in the medium and/or high security modes, the application firmware using a hash code and/or digitally sign (e.g., using SHA-1, AES, and/or RSA) the application firmware using a known digital signature (e.g., the digital signature of the maker of the processor 20). The processor 20 can be configured to, while operating in the medium and/or high security level, authenticate the encrypted/signed application firmware, authenticate the hash code and/or digital signature, and execute the application firmware if the authentication is validated. Furthermore, the application firmware can be updated throughout the life of the system 5 (via the host 25) by downloading updated authenticated (e.g., using a hash code and/or a digital signature) application firmware from the trusted source via the Internet.

The processor 20 can be configured to include a unique serial number that can be provided to the host 25 for identification. The unique serial number can be stored in the EEPROM 35, or elsewhere in the processor 20. The encryption module 215 can be configured to associate the unique serial number with the encrypted processed video signal that is provided to the host 25. The host 25 can be configured to limit access to the encrypted processed video signal depending on the presence or absence of the processor 20. For example, the host 25 is configured to limit access to the video signal if the processor 20 that generated the encrypted processed video signal is not coupled to the host 25. The host 25 can be configured to limit access to the encrypted processed video signal, for example, by inhibiting display of the video signal, inhibiting copying of the video signal, etc. The use of the unique serial number can increase the difficulty of unauthorized sharing of the encrypted processed video signal.

Figure 3:
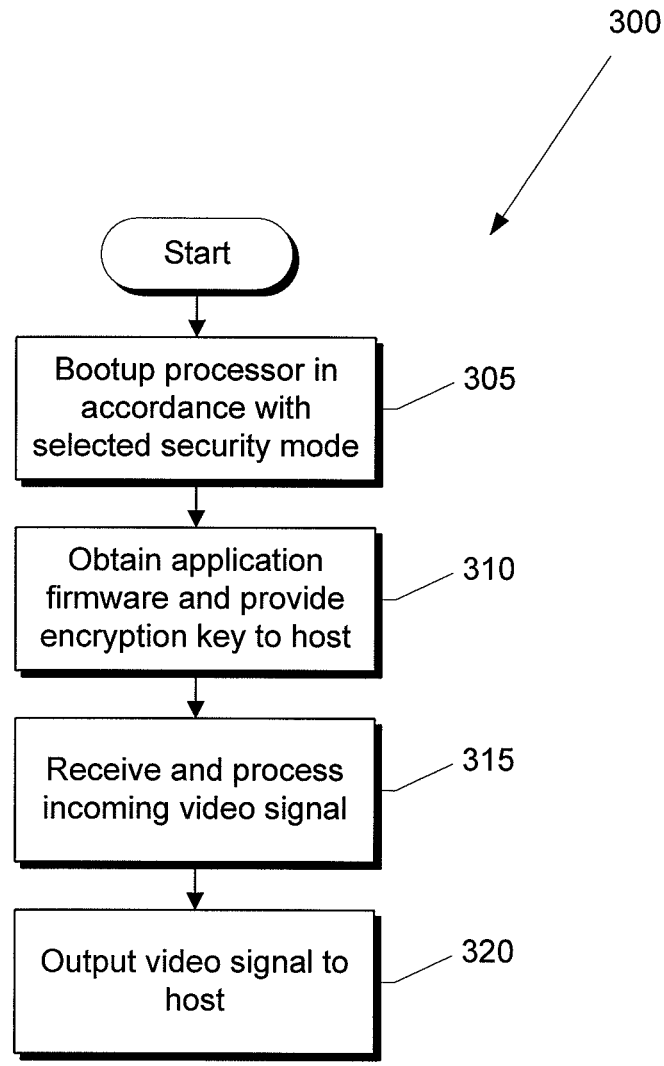
FIG. 3 is a block flow diagram of a process of processing a content-protected video stream using the device shown in FIG. 1.

In operation, referring to FIG. 3, with further reference to FIGS. 1-2, a process 300 for processing a content-protected video stream using the system 5 includes the stages shown. The process 300, however, is exemplary only and not limiting. The process 300 may be altered, e.g., by having stages added, removed, or rearranged.

At stage 305, power is provided to the system 5 and the processor 20 begins a bootup sequence. A security mode of the processor 20 is selected by providing a selection signal to the bootloader module 240. The selection signal is provided via a hard-wired connection within the processor 20 and/or via an external connection of the processor 20. The bootloader module 240 retrieves the bootup instructions from either the EEPROM 35 and/or from the host 25, depending on the selected security mode. The bootloader 240 causes the bootup instructions to be provided to the DSP module 230.

At stage 310, the DSP module 230 retrieves the application firmware from the host 25 via the connection 40. If the processor 20 is operating in the no-security, or low security mode, after receiving the application firmware from the host 25, the DSP module 230 executes the application firmware. If the processor 20 is operating in the medium or the high security mode, the DSP module 230 authenticates the application firmware provided by the host 25. The DSP 230 authenticates the application firmware by validating a hash code included with the application firmware and/or by validating a digital signature used to sign the application firmware. The authenticated application firmware is executed by the DSP module 230. The encryption module 215 also, if desired, provides a decryption key to the host 25 using, for example, a standard public key encryption method based on an encryption scheme such as RSA.

At stage 315, the system 5 receives incoming analog and/or digital video signals via the analog signal module 10, and/or the digital signal module 15, respectively. The analog signal module 10 processes the incoming analog video signal (e.g., selects a specific channel) and provides the analog video signal to the analog input processing module 205. Likewise, the digital signal module 15 processes the incoming digital video signal (e.g., selects a specific channel) and provides the digital video signal to the digital input processing module 210. The analog input processing module 205 further processes the incoming analog video signal (e.g., A-to-D converting, filtering, recognizing content protection, etc.). The digital input processing module 210 further processes the incoming digital video signal (e.g., resampling, recognizing content protection, etc). The outputs of the analog input processing module 205 and the digital input processing module 210 are provided to the DSP module 230. The DSP module 230 processes the incoming video signals, e.g., according to instructions included in the application firmware executed during stage 310. For example, the DSP module 230 converts a raw digital video stream (provided by the analog input processing module 205) into an MPEG transport stream, compresses the digital video signal received from the digital input process module 210, etc. The DSP module 230 outputs an MPEG transport stream corresponding to the raw digital video stream provided by the analog input processing module 205, and outputs an MPEG transport stream corresponding to the digital signal provided by the digital input processing module 210. Each of the MPEG transport streams includes transport stream packets.

At stage 320, the encryption module 215 encrypts the MPEG transport streams produced by the DSP module 230. The encryption module 215 encrypts a payload portion of the transport stream packet using AES encryption. Alternatively, the DSP module 230 can perform the encryption process. The encrypted transport streams are provided to the host interface 225. The host interface 225 provides the encrypted transport streams to the host 25 via the connection 40. The host 25 receives the encrypted transport streams and performs decryption using a key stored within the host 25.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

While the above discussion has discussed the system 5 in the context of processing video signals, other signals can be processed. For example, the system 5 can be configured to process audio signals, cellular transmissions, communications transmissions, Ethernet packets, voice over IP (VoIP) packets, etc. Thus, the system 5 can be used in contexts other than video signal processing.

Further, while the description above refers to the invention, the description may include more than one invention.

What is claimed is:

1. A method comprising:
receiving a selection signal indicating a selected security level from among a plurality of security levels;
booting a processor via a boot loader module within the processor in accordance with the selected security level to operate in a selected security mode;
receiving by the processor operating in the selected security mode a content carrying signal that includes content protection;
determining from the content carrying signal a type of content protection associated with the content carrying signal by the processor operating in the selected security mode recognizing the presence of content protection in the content carrying signal;
processing the content carrying signal by the processor operating in the selected security mode in accordance with the type of content protection and the selected security level to produce an intermediate signal;
encrypting at least a portion of the intermediate signal the processor operating in the selected security mode, in accordance with the type of content protection and the selected security level, to produce an encrypted signal and providing a decryption key to the host when required by the selected security mode; and
outputting from the processor operating in the selected security mode the encrypted signal to the host in accordance with the selected security level.

2. The method of claim 1 wherein booting the processor includes obtaining application firmware from a host.

3. The method of claim 1 wherein booting the processor includes authenticating application firmware in accordance with the selected security level.

4. The method of claim 1 wherein booting the processor includes obtaining boot instructions from a boot memory coupled to the processor.

5. The method of claim 1 further comprising demodulating an incoming signal using a tuner and providing the demodulated signal as the content carrying signal to the processor.

6. The method of claim 1 further comprising preserving the content protection associated with the content carrying signal in the encrypted signal.

7. The method of claim 1 wherein the processing the content carrying signal includes at least one of: digitizing, compressing, resampling, filtering or color converting the content carrying signal.

8. A multimedia capture device for use with a content carrying signal including content protection, the device comprising:
a host; and
a processor including a boot loader module coupled to the host and configurable to operate in a plurality of security modes corresponding to a plurality of security levels;
the processor configured to operate in a selected one of the security modes by executing a bootup sequence in accordance with the a selected security level received via the boot loader module and retrieving operational instructions from the host in accordance with the selected security level;
the processor configured to operate in the selected security mode to receive the content carrying signal and identify the presence of the content protection;
the processor configured to operate in the selected security mode to determine from the content carrying signal a type of content protection associated with the content carrying signal;
the processor configured to operate in the selected security mode to process the content carrying signal to produce an intermediate signal in accordance with the operational instructions, the selected security level and the type of content protection;
the processor configured to operate in the selected security mode to encrypt a portion of the intermediate signal, in accordance with the operational instructions, the selected security level and the type of the content protection, to produce an encrypted signal such that a decryption key is provided to the host when required by the selected security mode; and
the processor configured to operate in the selected security mode to provide the encrypted signal to the host in accordance with the selected security level.

9. The multimedia capture device of claim 8 wherein the processor is further configured to obtain the bootup sequence from a boot memory.

10. The multimedia capture device of claim 8 wherein the processor is further configured to obtain application firmware from the host.

11. The multimedia capture device of claim 10 wherein the processor is further configured to authenticate the application firmware in accordance with the selected security level.

12. The multimedia capture device of claim 8 wherein the processor is further configured to demodulate the content carrying signal.

13. The multimedia capture device of claim 8 wherein the processor is further configured to preserve the content protection associated with the content carrying signal.

14. The multimedia capture device of claim 8 wherein the processor is configured to process the content carrying signal by performing at least one of: digitizing, compressing, resampling, filtering or color converting the content carrying signal.

* * * * *